Jan. 13, 1925.
T. A. DICKINSON
CHART LOCKING DEVICE
Filed Nov. 4, 1922
1,523,002
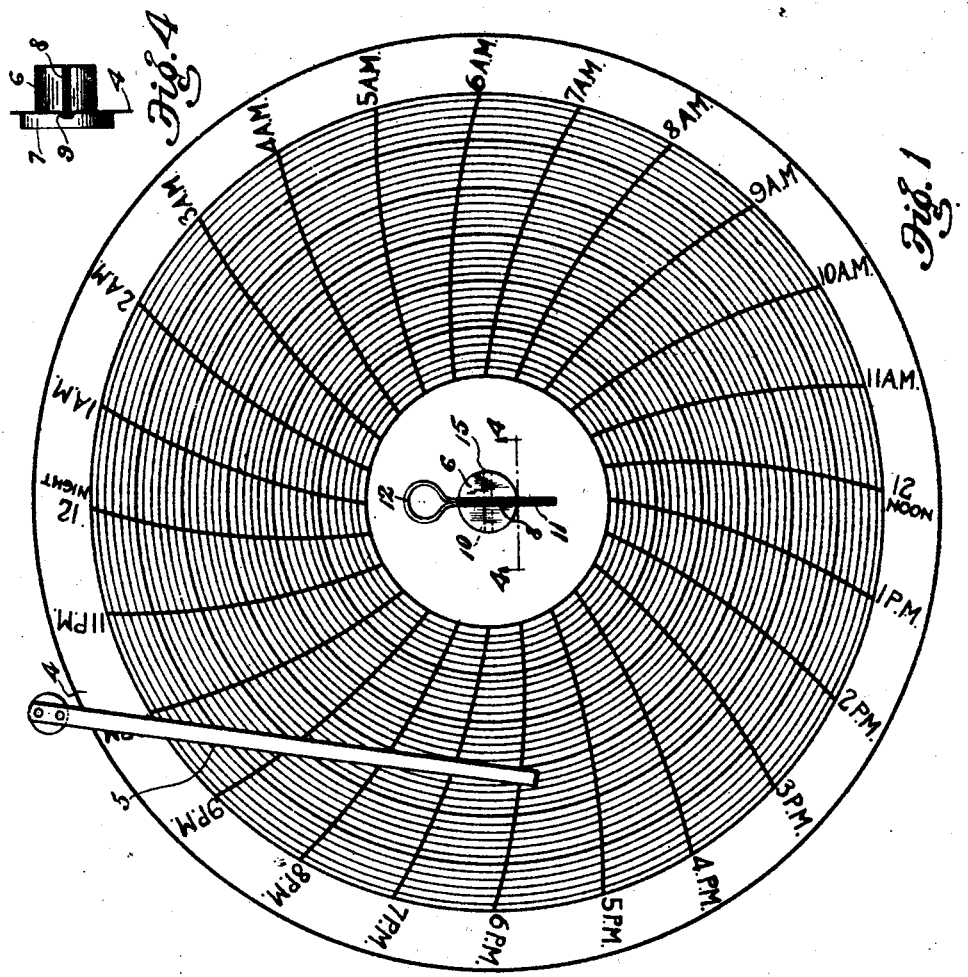
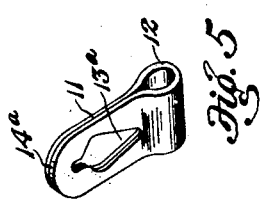
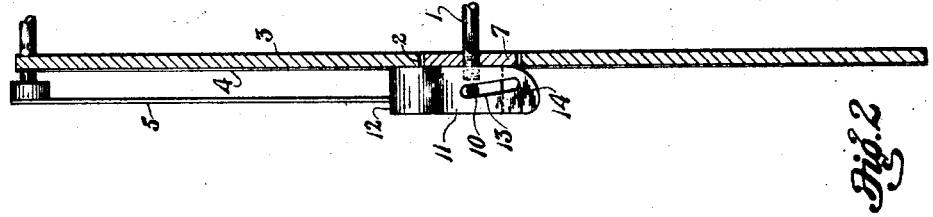
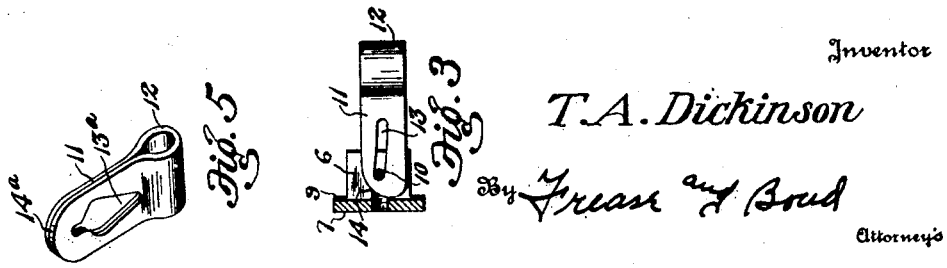
Inventor
T. A. Dickinson
By Frease and Boud
Attorneys Patented Jan. 13, 1925.

1,523,002

UNITED STATES PATENT OFFICE.

THOMAS A. DICKINSON, OF STRUTHERS, OHIO.

CHART-LOCKING DEVICE.

Application filed November 4, 1922. Serial No. 599,125.

*To all whom it may concern:*

Be it known that I, THOMAS A. DICKINSON, a subject of the King of Great Britain, residing at Struthers, in the county of Mahoning and State of Ohio, have invented a new and useful Chart-Locking Device, of which the following is a specification.

This invention relates to a chart locking device. Many recording instruments use a circular chart on which records are made by means of a pen or pencil, recording upon the chart the action of the machine throughout the twenty-four hours of the day, the records appearing on the chart opposite to the time which is printed thereon.

To accomplish this, it is necessary for the chart to be rotated by clock work at a speed to correspond with the hours marked thereon, which is usually one complete revolution in twenty-four hours, as such charts are generally changed daily. A rotating spindle is provided upon the recording instrument arranged to rotate at the desired speed, the chart being connected to the rotating spindle and arranged to rotate therewith.

The usual manner of attaching the chart to the spindle is by means of a disk carried upon the end of the spindle and provided with a threaded extension which is passed through the central opening in the chart and upon which a threaded nut is mounted to secure the chart in place.

This construction is unsatisfactory in many ways, as the nut is often lost in changing the charts, as it is, of course, necessary to remove the nut in order to remove the old chart and place a new one upon the spindle; the nut frequently crossthreads and will not hold the chart tightly; special spindle locking devices are required to prevent the rotation of the nut from unscrewing the spindle from the clock. If the chart sticks to the chart plate, the turning action of the spindle tends to unscrew the nut, and the nut, when slightly worn, will not screw tightly against the chart and clamp the same to the spindle so that it will rotate properly.

Another device is in common use for locking the chart upon the spindle, but this device is expensive to manufacture and difficult to operate in order to remove the chart and place a new chart upon the spindle, and it has been found by use that this device also has most of the disadvantages found in the chart nut.

The objects of the present invention are to provide a chart locking device which can be manufactured at a less cost than the chart nut or other chart locking device in common use; which will be simply and easily operated; and which will overcome the disadvantages found in the chart locking devices at present in common use.

The above and other objects may be attained by constructing the chart locking device in the manner illustrated in the accompanying drawing, in which—

Figure 1 is a front elevation of a chart showing the application of the improved chart locking device;

Fig. 2, a transverse sectional view of the same;

Fig. 3, a fragmentary and sectional view of the chart locking device, showing the same in the opened or unlocked position;

Fig. 4, a section on the line 4—4, Fig. 1; and

Fig. 5, a perspective view of a modified form of locking lever designed to permit a throw of 180°.

Similar numerals of reference indicate corresponding parts throughout the drawing.

Recording instruments of the character to which this invention pertains, include a spindle 1 arranged to be rotated at a proper speed, generally one complete revolution in twenty-four hours by means of clock work not shown. The outer end of this spindle extends through an opening 2 in a chart plate 3, which is fixed in any suitable manner and permits the spindle to rotate therethrough, a paper chart, as indicated at 4, being fixed upon the end of the spindle and arranged to rotate therewith.

The usual pen or pencil 5 is operatively connected to the machine, the operation of which is to be recorded and is arranged to bear upon the surface of the chart, and as the same rotates slowly, the pen records the action of the machine during the entire twenty-four hours, the time being printed upon the chart.

This much of the construction is common in recording instruments at present in general use and the details of construction of these parts do not form any part of this invention, which pertains entirely to the chart locking device by means of which the paper chart is attached to the spindle.

This locking device includes a head 6 upon the outer end of the spindle 1, which may be formed integrally therewith, or which may be fixedly attached thereto in any suitable manner as by the screw threads shown in the drawing. This head is provided at its inner end with the flange 7 which is accommodated within the central aperture 2 of the chart plate and the outer end of the head is provided with a radial slot 8, terminating in the radial groove 9, formed in the outer face of the flange.

A pin 10 is fixed in the head and extends transversely through the central portion of the slot 8, the locking lever 11 being mounted upon said pin. This operating lever is preferably formed of spring metal, the central portion of which is formed into an eye as at 12, the two end portions being pressed together and locked within the slot 8.

An inclined cam slot 13, as shown in Figs. 2 and 3, or 13ª as shown in Fig. 5, is formed in the operating lever and receives the pin 10. The end of the lever 11 may be quarter round as shown at 14 in Figs. 2 and 3, or half round as shown at 14ª in Fig. 5, in order to permit of a 90° swing or a 180° swing of the lever respectively.

When it is desired to insert a chart upon the spindle, the lever is swung upon the pin 10 into the position shown in Fig. 3, when the chart 4 may be placed in position as shown in said figure, against the flange 9 of the head of the spindle, the central opening 15 of the chart permitting the same to be passed over the outturned lever.

The lever is then swung downward and pushed forward upon the pin 10 until the inclined slot therein binds upon the pin as shown in Fig. 2, the under edge of the lever forcing the chart down into the groove 9, crimping the same and preventing movement of the chart relative to the spindle.

The chart is now in position to operate in the usual manner and will be held rigidly upon the spindle. In order to remove the chart, the lever is pulled outward upon the pin until the outer end of the slot engages the pin, after which the lever is swung outward to the position shown in Fig. 3, when the chart may be easily removed and a new chart placed upon the spindle.

It will be obvious from the above that with a device of this character, the disadvantages found in the nut and other chart locking devices are overcome, as the locking device is attached to or made a part of the spindle and no part of the same is removed from the spindle when the charts are changed.

The cam slot of the locking lever firmly wedges the chart against the flange of the head and crimps the chart in the groove of the flange, thus preventing any movement of the chart upon the spindle. The locking lever being made of spring material, tends to hold the same in any position in which it is placed.

I claim:—

1. A chart locking device of the character described including a flanged head, a locking lever pivotally mounted upon the head and arranged to be swung downward to lock a chart against said flange, the flange having a groove, the lever being arranged to crimp the chart into the groove.

2. A chart locking device of the character described including a flanged head, a locking lever pivotally mounted upon the head and arranged to be swung downward to lock a chart against said flange, and means for holding the locking lever in the locked position, the flange having a groove, the lever being arranged to crimp the chart into the groove.

3. A chart locking device of the character described including a flanged head, a locking lever pivotally mounted upon the head and arranged to be swung downward to lock a chart against said flange, said lever having a slot engaging the pivot and permitting longitudinal movement of the lever to hold the same in the locked position, the flange having a groove, the lever being arranged to crimp the chart into the groove.

4. A chart locking device of the character described including a flanged head provided with a radial slot, a pin extending transversely through the slot and a locking lever provided with an inclined slot engaging the pivot, the flange having a groove, the lever being arranged to crimp the chart into said groove.

THOMAS A. DICKINSON.